United States Patent [19]
Abe et al.

[11] Patent Number: 5,467,289
[45] Date of Patent: Nov. 14, 1995

[54] METHOD OF AND AN APPARATUS FOR MEASURING SURFACE CONTOUR

[75] Inventors: Makoto Abe; Shigekata Ohta; Hiroyuki Tokitoh, all of Kawasaki; Morimasa Ueda, Tsukuba; Takahumi Kano, Kure; Hiroyuki Hidaka, Miyazaki, all of Japan

[73] Assignee: Mitutoyo Corporation, Tokyo, Japan

[21] Appl. No.: 134,915

[22] Filed: Oct. 12, 1993

[30] Foreign Application Priority Data

Oct. 15, 1992 [JP] Japan .................................. 4-277156
Oct. 15, 1992 [JP] Japan .................................. 4-277157

[51] Int. Cl.$^6$ .................................................. G01B 5/008
[52] U.S. Cl. .............. 364/560; 364/474.03; 364/474.02; 364/474.36; 364/571.01; 364/571.05; 356/360; 356/376; 356/377
[58] Field of Search .............................. 364/560, 474.03, 364/474.02, 474.05, 571.01, 571.05, 167.01, 474.36; 356/377, 376, 72, 360; 33/503

[56] References Cited

U.S. PATENT DOCUMENTS

4,908,951   3/1990   Gurny ................................ 364/560 X
4,945,501   7/1990   Bell et al. ........................ 364/571.05

Primary Examiner—Edward R. Cosimano
Assistant Examiner—Kamini S. Shah
Attorney, Agent, or Firm—Flynn, Thiel, Boutell & Tanis

[57] ABSTRACT

A measurement-datum similar to profile of a measuring object set in a measuring area in which a detector and the measuring object are moved relatively is formed to measure the displacement value between the detector and the measuring object through the relative movement based on the measurement-datum to thereby compute the surface contour of the measuring object from the measured data with reference to the measurement-datum. Since the measurement-datum is set in the spatial area, a precise mechanical processing will not be required for an accurate measurement of the measuring object having a strange profile which was not measured by conventional apparatus.

19 Claims, 12 Drawing Sheets

METHOD OF AND AN APPARATUS FOR MEASURING SURFACE CONTOUR

BACKGROUND OF THE INVENTION

1. Field of the Invention

This invention broadly relates to a method of and an apparatus for measuring a surface contour of a measuring object by relatively moving a detector and the object and, more particularly, a method and an apparatus to be used to grasp an outline of the measuring object by relatively moving the detector, such as a non-contacting or contacting type detector, and the measuring object to measure the surface contour of the measuring object with or without keeping a contacting state therebetween, when measuring a right-angled, round-shaped, elliptical profile or a profile combining them all together.

2. Description of the Related Art

Figure 14:
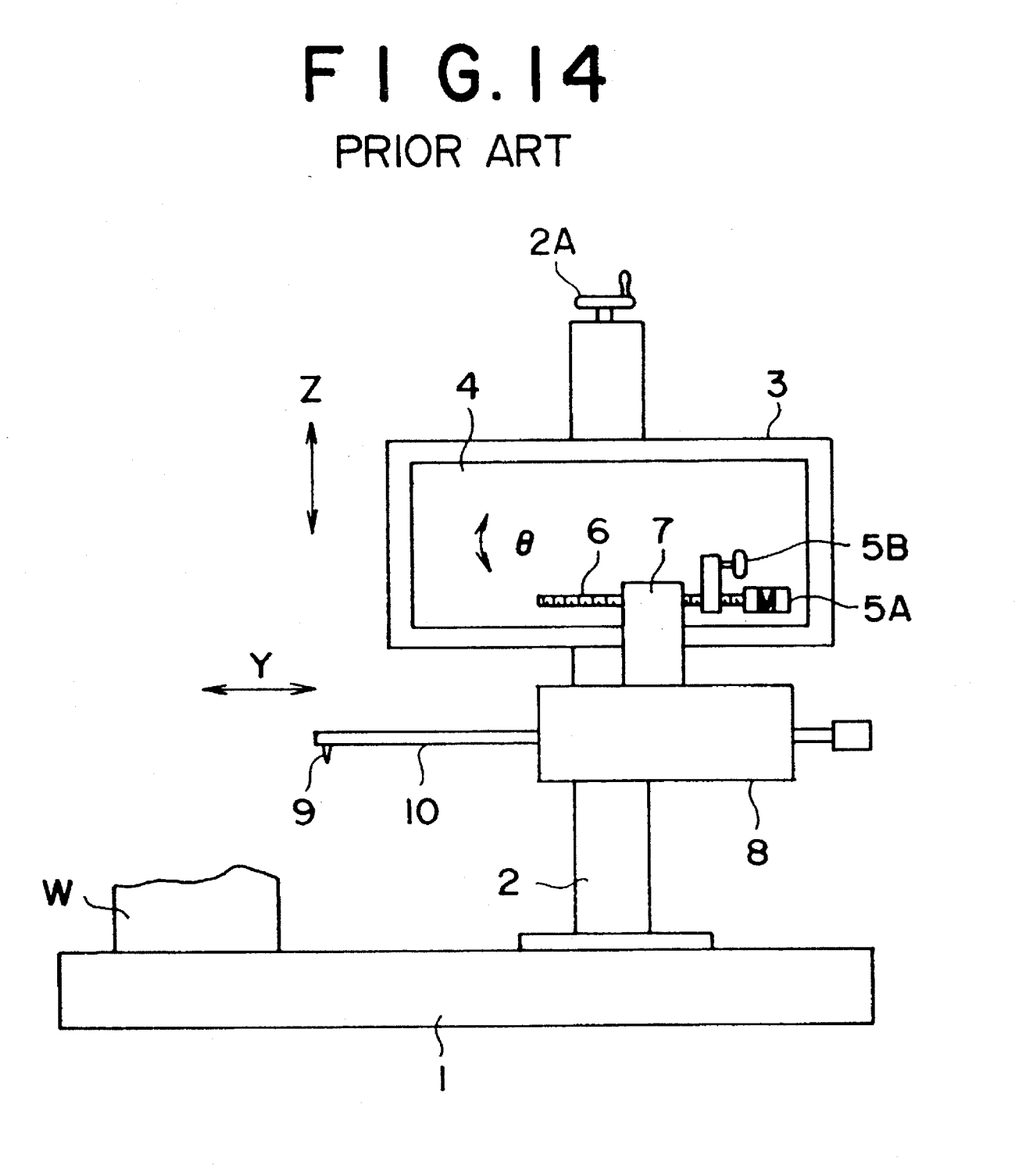
FIG. 14 is a diagrammatic view depicting a conventional surface contour measuring apparatus.

An instrument as diagrammatically depicted in FIG. 14 has previously been used to measure a surface contour of an object to be measured. Reference numeral 1 in the drawing is a base for supporting a vertical column 2 thereon. The column 2 has slidably guided, thereon an elevation device 3 movable in an up-and-down direction (Z-direction) by means of a not-shown feed screw. The elevation device 3 has therein a pivotal movement system 4 pivotal by a certain angle (θ) about an axis extending perpendicularly to the vertical axis of the column 2 (an axis intersecting the drawing depicted in FIG. 14. The pivotal movement system 4 has a feed screw 6 adapted to be rotated by a motor 5A or a manually operated handle 5B.

The feed screw 6 is provided via a connection member 7 such as a nut to reciprocally carry a detector 8 in a right-and-left direction (X-direction) in the drawing. The detector 8 has a measuring arm 10 with a stylus 9 at the forward end in a state to move up-and-down pivotally and a displacement value detecting sensor (not-shown) such as a liner voltage differential transformer (LVDT) to electrically detect a pivoting degree of the measuring arm 10. Incidentally, a member designated by the reference numeral 2A is a manually operated handle designed to effect a movement of the elevation device 3 vertically up-and-down (Z-direction).

When conducting a measurement with this measuring apparatus, the measuring object W is first located on the base 1 and the stylus 9 is then moved to a point on the upper surface of the measuring object W where the measurement begins. The detector 8 is moved reciprocally in the X-direction corresponding to the rotation of the feed screw 6 by the motor 5A. As the detector 8 moves into the X-direction, the stylus 9 of the measuring arm 10 tosses in response to the surface irregularities of the measuring object W. The movement of the measuring arm 10 is detected by the displacement value detecting sensor (not-shown) to measure the surface contour of the measuring object W.

As can be understood from the above-descriptions, the conventional surface contour measuring apparatus is naturally adapted to regard the rectangular coordinates defined by the base 1 and the column 2 as measurement-datum, so that the mechanical accuracy of the apparatus is always a main factor of accuracy in measurement. The flatness of the base 1, the straightness of the movement of the detector 8 with the measuring arm 10 and the displacement value detecting sensor, and the verticalness of the column 2 against the base 1 should be a main factor of accuracy in measurement. Accordingly, the conventional machine requires a high order of accuracy in assembling and adjusting it and also a great deal of time in maintenance.

When a contacting detector will be used, a stylus thereof may cause the same problem because the radius of the stylus may involve an error, so that some compensation means for the radius error is inevitably to be provided. The error of the radius should influence unnecessarily a measurement signal referencing the Z-direction or the X-direction. This will be remarkable when requiring a high order of accuracy. It is known that, in the non-contacting type detector, an optical axis of the detector should be aligned with a normal axis of the surface of the measuring object as much as possible to achieve the high order of accuracy. However, the conventional apparatus could not shift its posture preferably corresponding to the irregularities of the measuring object to execute a preferable measurement.

The possible measuring range along the X-direction coordinate axis can be extended whereas that of the Z-direction coordinate axis will be limited. Accordingly, the measuring object was limited to be a flat one, so that other ones having a right-angled, round-shaped, elliptical profile or a profile combining them all together could not be measured easily.

If it will be required to conduct the surface contour measurement with the conventional apparatus, the measuring object is generally tilted before measurement. But, the measuring range tends to be narrow in spite of having enough measuring range in the X-direction.

In a circularity test, the measuring object is rotated through measurement while maintaining a coaxial alignment of the measuring object and the rotation device to rotate the measuring object. This alignment work is a time-consuming one and requires much skill. In this measurement, the measuring range or capacity is also limited as in the method which is done by tilting the measuring object. Accordingly, if we need to measure a surface contour of the measuring object, such conventional apparatus was not available to obtain the necessary data.

The object of the present invention is to solve such problems without requiring a precise mechanical processing and adjustment to conduct precise surface contour measurement to thereby provide a method and an apparatus capable of measuring any measuring surface which was not measured by the conventional apparatus.

SUMMARY OF THE INVENTION

Accordingly, a method according to the present application is the method of measuring a surface contour of a measuring object by a surface contour measuring apparatus having a displacement system for relatively moving a detector and the measuring object, the method comprising the steps of: originating measurement-datum which is an outline similar to a profile of the measuring object put in a measuring area in which the detector and the measuring object move relatively; measuring a displacement value between the detector and the measuring object by moving the detector and the measuring object relatively in accordance with the originated measurement-datum; and computing surface contour of the measuring object in accordance with the measured displacement value.

When originating the measurement-datum, the method may further comprise the step of: originating and memorizing compensation data to compensate a gap between a spatial coordinate axes made in the measuring area and a mechanical coordinate axes of the displacement system after putting in the measuring area a measuring standard of which surface contour is precisely understood, moving the measuring standard and the detector relatively to actually measure surface contour or position data of the measuring standard, and thereafter making the spatial coordinate axes based on the measured relative position of the detector and the measuring standard, so that the originated measurement-datum or the measured displacement value data is corrected based on the compensation data when originating measurement-datum or computing surface contour of the measuring object.

Incidentally, the measuring standard is a right angled measuring standard of which surface contour is precisely understood and the spatial coordinate axes may be a rectangular spatial coordinate axes.

The step of originating measurement-datum may include preliminarily measuring a displacement value between the detector and the measuring object by moving the detector and the measuring object relatively within the measuring area and to originating a relative movement locus similar to a profile of the measuring object in the measuring area as the measurement-datum in accordance with the preliminary measured displacement value.

The step of originating measurement-datum may include to preliminarily measure a displacement value between the detector and the measuring object through the relative movement thereof and to generate relative movement locus as to set a relative movement locus having a similar shape to the measuring surface of the measuring object and being compensated by a compensation data obtained through the compensation data originating step based on the measurement data obtained through the preliminary measurement step, as the measurement-datum in the measuring area. Incidentally, the measuring object is located at a predetermined place by a fixture in the measurement step and preliminary measurement steps. And, the preliminary measurement step is to relatively move the measuring object and the detector in accordance with a movement locus of the detector.

A surface contour measuring apparatus according to the present invention is to comprise a table for mounting thereon a measuring object; a detector mounting member; a movement system for relatively moving the table and the detector mounting member in a X-direction and in a Z-direction perpendicular to the X-direction; a rotating table rotating relatively to the detector mounting member about a pivot extending in a direction perpendicular to the X- and Z-directions; a detector provided on the rotating table to detect, as an electric signal, a distance from a measuring surface of the measuring object located within a detectable area of the detector; and a computing device having a memory means for storing therein data regarding measurement-datum similar to profile of the measuring object in a spatial area in which the table and the detector move relatively, a measuring means for measuring a displacement value of the detector and the measuring object through the relative movement of the detector and the measuring object in accordance with the measurement-datum, and a contour computing means for obtaining the surface contour of the measuring object based on the measured data in the measuring means to thereby formulate a surface contour of the measuring object in accordance with output from the detector.

Incidentally, the movement system is defined by a X-axis drive means for moving the table in the X-direction, a Y-axis drive means for moving the table in the Y-direction perpendicular to the X- and Z-directions, and a Z-axis drive means for moving the detector mounting member. The X-axis drive means, the Y-axis drive means and the Z-axis drive means include feed screws and motors to rotate the feed screws.

The detector should be a non-contacting type and is located to have a detectable area including the central axis of the pivot. The detector preferably has a light source, an optical system including an object glass to apply light from the light source on the measuring surface, a detecting circuit issuing signal corresponding to a difference between the focal point of the object glass and the measuring surface, a driving system for moving the object glass to coincide the focal point of the object glass with the measuring surface, and a position detecting means for detecting a position of the object glass.

And the memory means is adapted to memorize, as compensation data, the difference between a mechanical coordinates based on the movement system and a spatial coordinates determined based on a relative positional relationship between a measuring standard and the detector, and the computing device further includes a means for compensating the measurement-datum with reference to the compensation data store in the memory means.

The computing means may further include a means for controlling the drive means to move the detector and the measuring object relatively in accordance with the measurement-datum stored in the memory means.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE PREFERRED EMBODIMENT

The preferred embodiment of the present invention will now be described with reference to the drawings.

Figure 1:
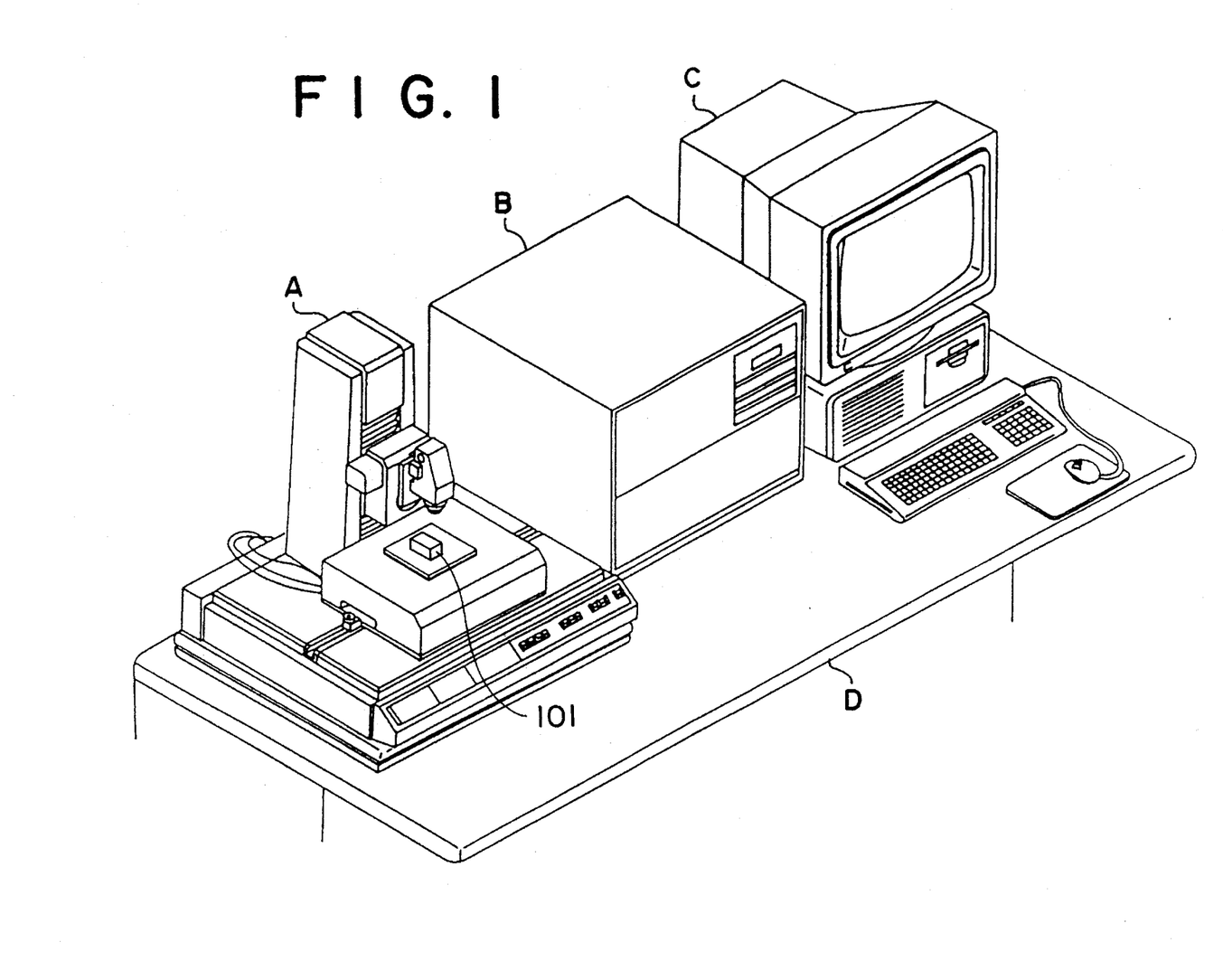
FIG. 1 is a perspective view of an overall composition in the first embodiment in accordance with the present invention.

FIG. 1 depicts the overall composition of a system for measuring a surface contour of a measuring object according to the first embodiment. This system is defined by a main body of the measuring apparatus A for measuring the measuring object put thereon, a computing device B to control the measuring apparatus A and to store the measured data, and a data analysis processing unit(host-computer) C to analyze the measured data sent from the computing device B and to display the result thereafter. The designation D is a table.

Figure 2:
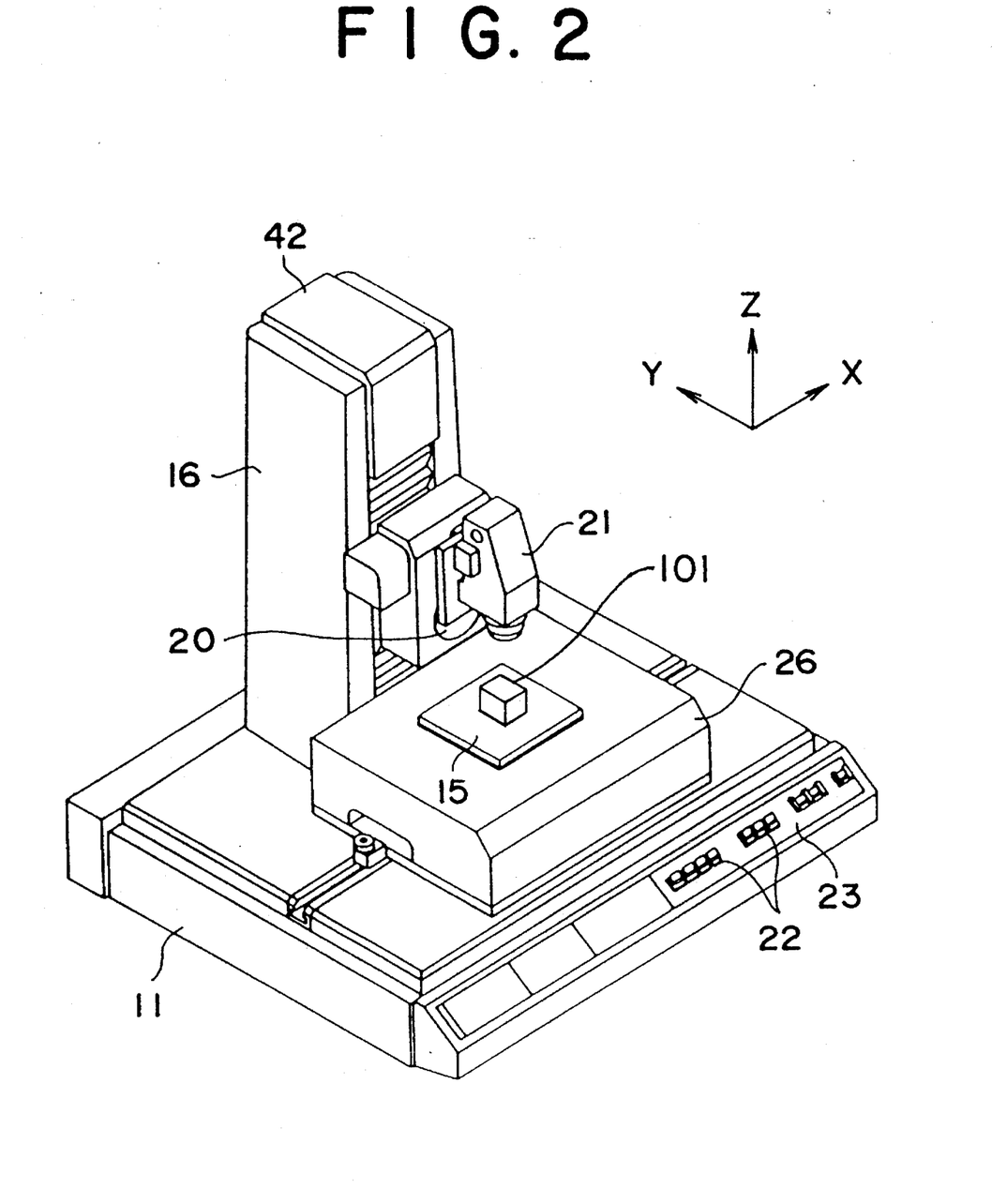
FIG. 2 is a perspective view of a measuring apparatus in the first embodiment.
Figure 3:
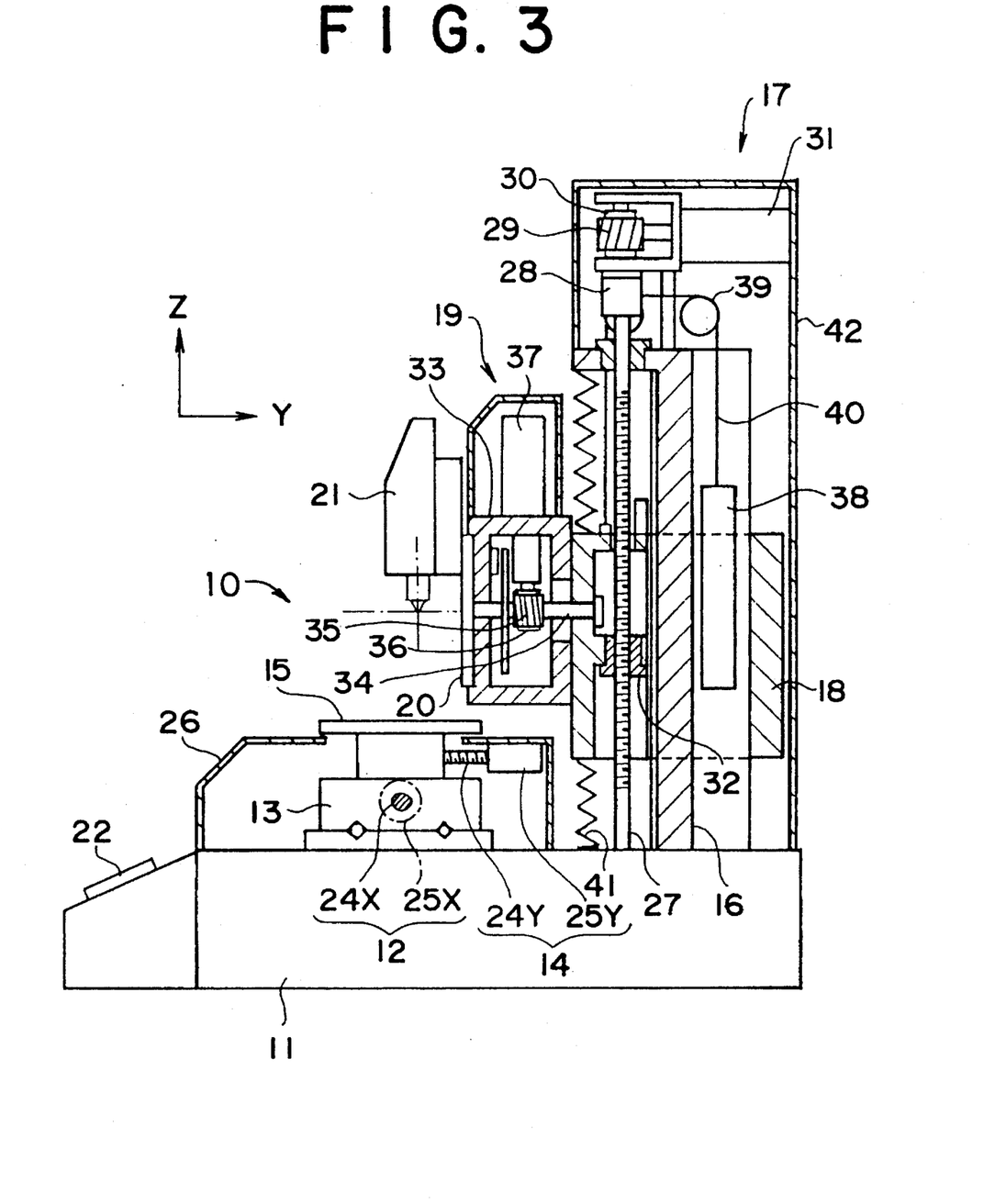
FIG. 3 is a vertical sectional view of a main body of the measuring apparatus.

The measuring apparatus A comprises, as shown in FIGS. 2 and 3, a base 11, a X-axis table 13 reciprocally movable on the base 11 by means of a X-axis drive means 12, a Y-axis table 15, moving in the Y-direction on the X-axis table 13 by means of a Y-axis drive means 14, for supporting thereon a measuring object 101, a column 16 standing behind the base 11, a Z-axis slider 18 vertically and slidably moving on the column 16 in the Z-direction by means of a Z-axis drive means 17, a turn table 20 mounted on the Z-axis slider 18 rotatably about an axis parallel to the Y-axis by means of a rotation drive means 19, and a non-contacting detector 21 located over the turn table 20 so as to keep the predetermined detection area. Incidentally, a movement system 10 for relatively moving the non-contacting detector 21 and the measuring object 101 is defined by the tables 13, 15 and 20, the Z-axis slider 18 and the drive means 12, 14, 17 and 19. The coordinate movement into the X-, Y- and Z-directions can be performed by the table 15 having the measuring object 101 thereon and the Z-axis slider 18 for supporting the detector thereon.

The base 11 is provided with plural switches 22 on a switch panel 23 attached at the front side thereof. The X-axis drive means 12 and the Y-axis drive means 14 is defined by feed screws 24X, 24Y and motors 25X, 25Y in a cover 26 secured on the base 11. The Z-axis drive means 17 is defined by a feed screw 27 rotatably provided in the column 16 in a state parallel to the Z-axis, a motor 31 related with the feed screw 27 via a speed reducer 28 and a helical gears 29, 30, and a nut member 32 received on the feed screw 27 and secured on the Z-axis slider 18. The rotation drive means 19 is defined by a pivot 34 extending in the Y-direction from the Z-axis slider 18 through a box 33 to receive the turn table 20 at its forward end, and a motor 37 rotating the pivot 34 via the helical gears 35, 36. The designation 38 is a balance weight connected to one end of a wire 40 of which the other end is connected via a block 39 over the column 16 with the Z-axis slider 18. The designation 41 is a dustproof bellows to cover the front of the column 16 when the Z-axis slider 18 reciprocally moves up-and-down and the designation 42 is a cover.

Figure 4:
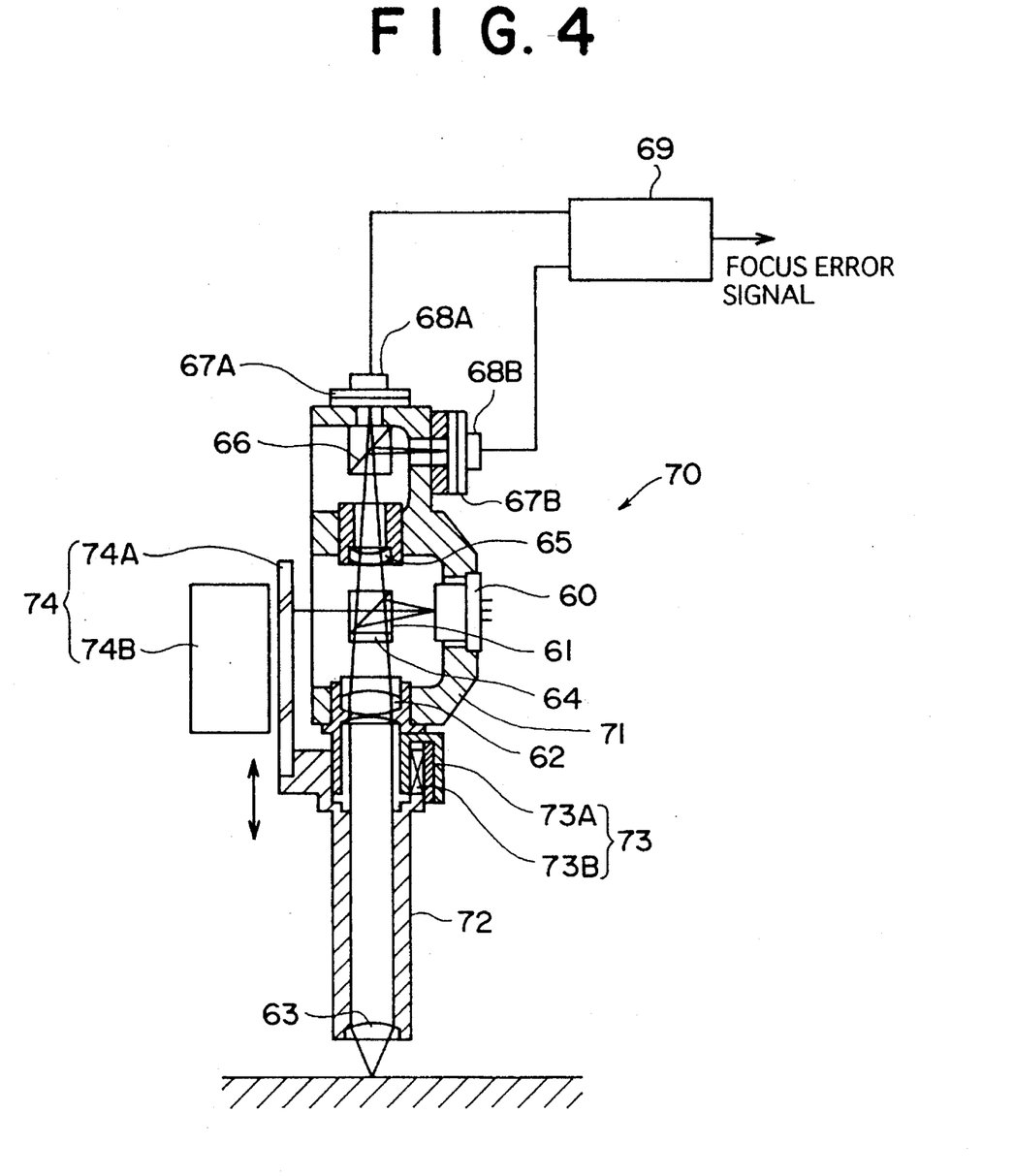
FIG. 4 is a sectional view depicting a non-contacting type detector he first embodiment.

An example of the non-contacting detector 21 is depicted in FIG. 4. In this drawing, the reference numeral 60 indicates a semiconductor laser as a light source, 61 indicates a polarizing beam splitter to reflect the light from the semiconductor laser 60 to a measuring surface of the measuring object, 62 indicates a collimator lens for regulating the light reflected at the polarizing beam splitter 61 into parallel beams, 63 indicates an object glass, and 64 indicates a ¼-wave plate for a high efficiency with a combination with the polarizing beam splitter 61 compared with a half-mirror. The reference numeral 65 is an image-formation lens for imaging the reflecting light passing through the beam splitter 61, 66 is a beam splitter for dividing the light passed through the image-formation lens 65. 67A and 67B are pin-hole plates located before and behind the focal points of the divided light by the beam splitter 66. 68A and 68B are light-interception elements such as photo-diodes for detecting luminous energy passed through the pin-hole plates 67A and 68B. and 69 is a detection circuit to receive output signals from both light-interception elements. Incidentally, an image-formation optical system 70 is defined by the beam splitter 61, the collimator lens 62, the object glass 63, the ¼-wave plate 64, and the image-formation lens 65.

The object glass 63 is mounted at a forward end of a movable lens-barrel 72 which is movable vertically in the main body of the measuring apparatus 71. There are provided, between the main body 71 and the movable lens-barrel 72, a drive system 73 to shift the movable lens-barrel 72 up-and-down and an encoder 74 as a position detecting means for detecting an actual vertical position of the movable lens-barrel 72 or the object glass. The drive system 73 is defined by a magnet 73A secured to the main body 71 and a moving coil 73B such as a voice-coil provided on the movable lens-barrel 72. The encoder 74 is defined by a scale 74A related to the movable lens-barrel 72 and a detector 74B secured to the main body 71 to oppose the scale 74A.

When applying a beam light of the semiconductor laser 60 to the surface of the measuring object through the beam splitter 61, the collimator lens 62 and the object glass 63, the reflected light from the measuring object is divided by the beam splitter 66 and separately received in the light-interception elements 68A, 68B through the pin-hole plates 67A, 67B. In the detection circuit 69, dividing the difference of output signal between two light-interception elements 68A and 68B by the sum of output signals of the light-interception elements 68A and 68B, a S-shaped focus error signal setting a gap between a focal point of the object glass 63 and the measuring surface can be obtained. The drive system 73 is activated to adjust the focal point of the object glass 63 on the measuring surface based on the S-shaped focus error signal, and an output from the encoder 74 will be utilized to detect the irregularities of the measuring surface. In this embodiment, an actual luminous energy at a point along the beam light axis near the focal point is continuously detected from the beam light and the reflected light of the same. At the same time, the object glass is shifted so that the focal point is adjusted on the surface of the measuring object, which distance is regarded as the irregularities of the measuring surface. Incidentally, the focal point is adapted to be made on the central axis of the pivot 34. In other word, the detector 21 is provided so that the measuring area thereof always contains the central axis of the pivot 34. The used detector 21 has a capacity to move by 10 millimeters, a measuring range from 600 to 6 micrometers, and a resolution from 0.2 to 0.002 micrometers.

Figure 5:
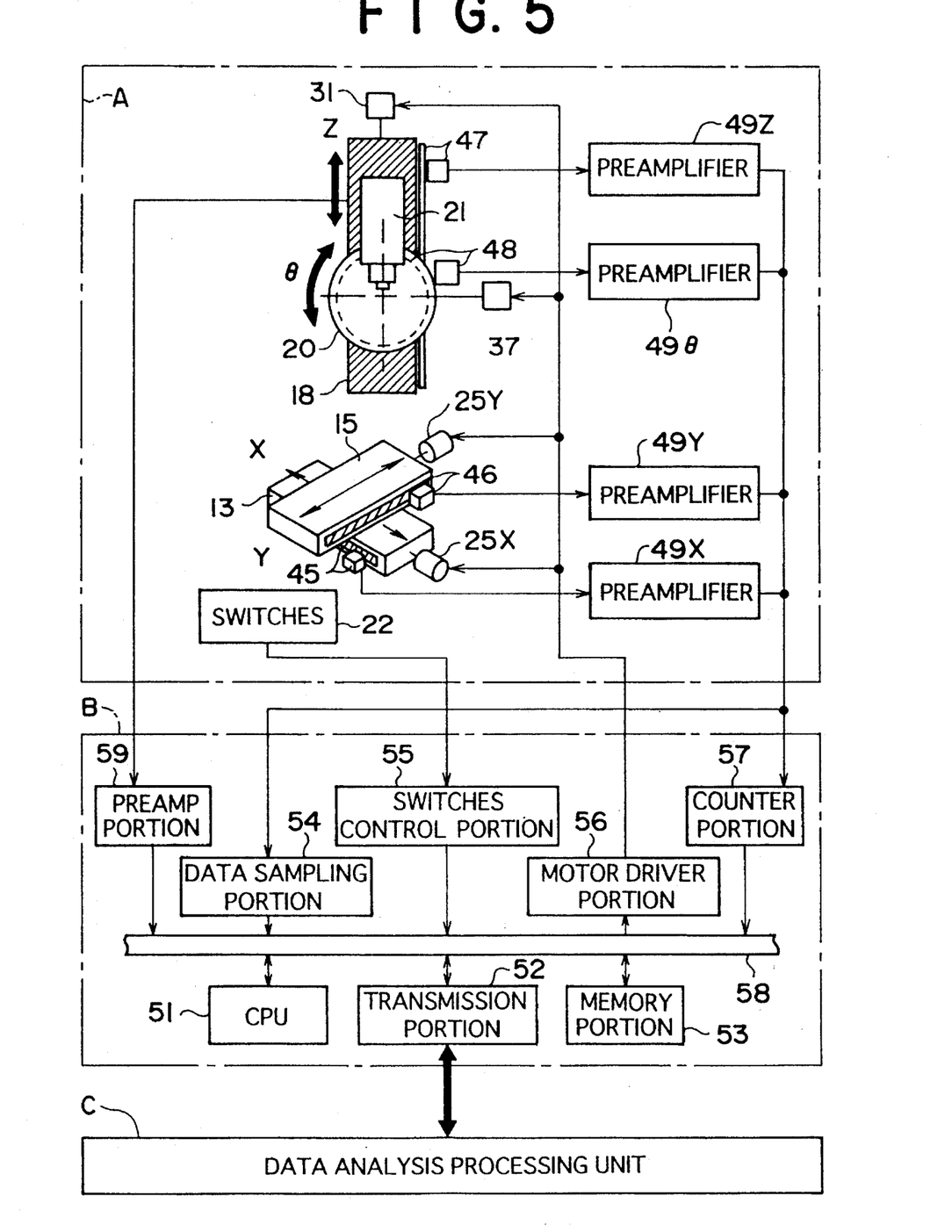
FIG. 5 is a block diagram of an electrical circuit in the first embodiment.

FIG. 5 is a block diagram depicting a circuit between the main body of the measuring apparatus A and the computing device B. The computing device B comprises a CPU 51, a transmission portion 52, a memory portion 53 as a memory means, a preamp portion 59, a data sampling portion 54, a switches control portion 55, a motor driver portion 56, a counter portion 57 and a bus 58 to connect therebetween. The CPU 51 is provided for processing data based on a prepared processing program stored in the memory portion 53, of which detail steps will be explained in an explanation of the operation. The transmission portion 52 connects to the data analysis processing unit C. The memory portion 53 further has other memory capacity such as a measurement map storing area memorizing various measurement maps, a datum storing area memorizing data of originated measurement-datum, a compensation data storing area memorizing compensation data, a data storing area memorizing inputted measurement-data, and the like.

The preamp portion 59 receives outputs from the non-contacting detector 21 synchronizing with the data sampling portion 54 to get the outputs at predetermined intervals. The data sampling portion 54 is adapted to receive outputs from preamplifiers 49X, 49Y, 49Z or 49θ selectively at predetermined sampling intervals. The switches control portion 55 receives data from the switches 22. The motor driver portion 56 connects with motors 25X, 25Y, 31 and 37 for the drive means 12, 14, 17 and 19. The counter portion 57 receives outputs from the encoders 45, 46, 47, 48 detecting displacement values of the drive means 12, 14, 17, 19 through the preamplifiers 49X, 49Y, 49Z, 49θ.

The encoder 45 which detects a displacement value in the X-direction has a X-axis scale attached on the X-axis table 13 along the X-direction and a detector secured on the base 11 so as to oppose the X-axis scale with a certain spacing therebetween. The encoder 46 which detects a displacement value in the Y-direction has a Y-axis scale attached on the Y-axis table 15 along the Y-direction and a detector secured on the table 13 so as to oppose the Y-axis scale with a certain spacing therebetween. The encoder 47 which detects a displacement value in the Z-direction has a Z-axis scale attached on the column 16 along the Z-direction and a detector secured on the Z-axis slider 18 so as oppose to the Z-axis scale 13 with a certain spacing therebetween. The encoder 48 for detecting a rotating angle θ of the non-contacting detector 21 comprises a rotatable disc secured to the pivot 34 and a detector secured to the box 33 so as to oppose the rotatable disc with a certain spacing therebetween.

The above apparatus in this invention facilitates an operative sequence as will be explained in more detail below with reference to FIGS. 6–12.

First, a measuring standard such as the right-angled measuring standard is set in the measuring area (=a relative movement area between the detector 21 and the measuring object) created by the movement system 10 before shipment. The profile and position of the measuring standard is measured in a relative movement of the measuring standard and the non-contacting detector 21, whereby spatial coordinate axes are originated. The difference between the spatial coordinate axes and the mechanical axes depending upon a mechanical precision of the movement system 10 is written in the memory portion 53 as the compensation data.

Figure 6:
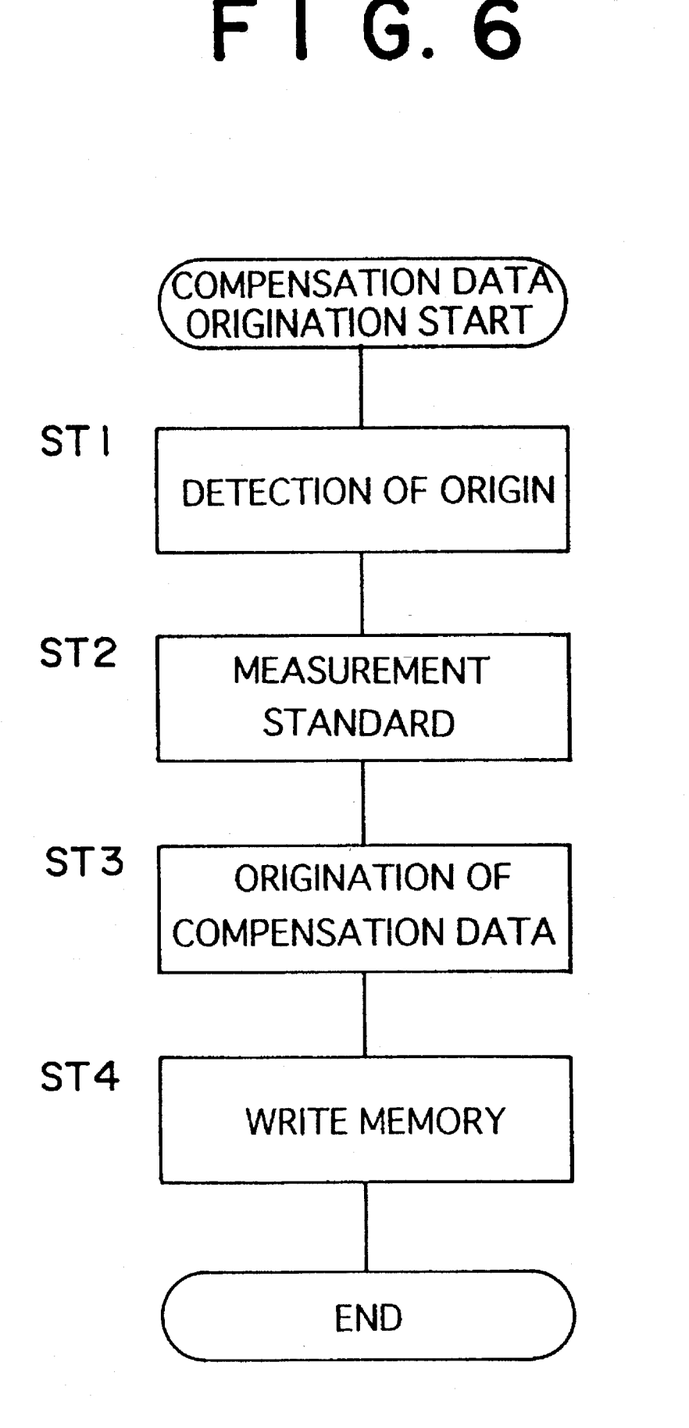
FIG. 6 is a flowchart depicting a process for originating compensation data in the first embodiment.

These steps are shown in a flowchart of FIG. 6. In step 1 (hereinafter referred to as ST 1), an origin for measurement is detected. In ST2, the measurement standard is then measured.

Figure 7:
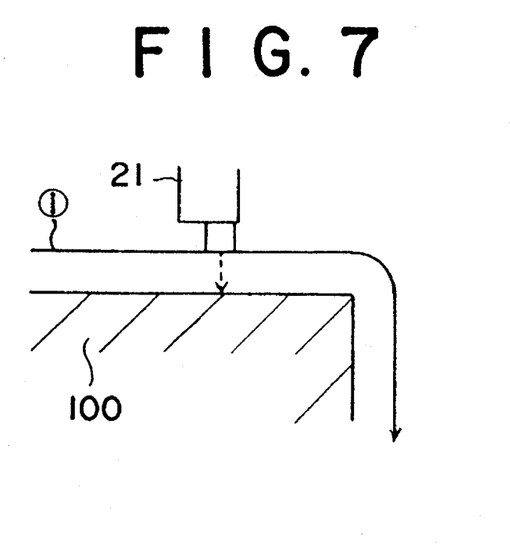
FIG. 7 is an operational view depicting how a measuring standard is measured in the first embodiment.

Taking for an instance, after a measurement standard 100 is set in the measuring area, the non-contacting detector 21 follows the moving tracks (1) down-loaded from the data analysis processing unit C which preliminarily sets and memorizes the moving tracks (1) for the right-angled profile of the standard 100 before measurement. In this movement, the measured data from the non-contacting detector 21, or the displacement value between the non-contacting detector 21 and the measuring standard 100 is obtained at predetermined intervals.

Figure 8:
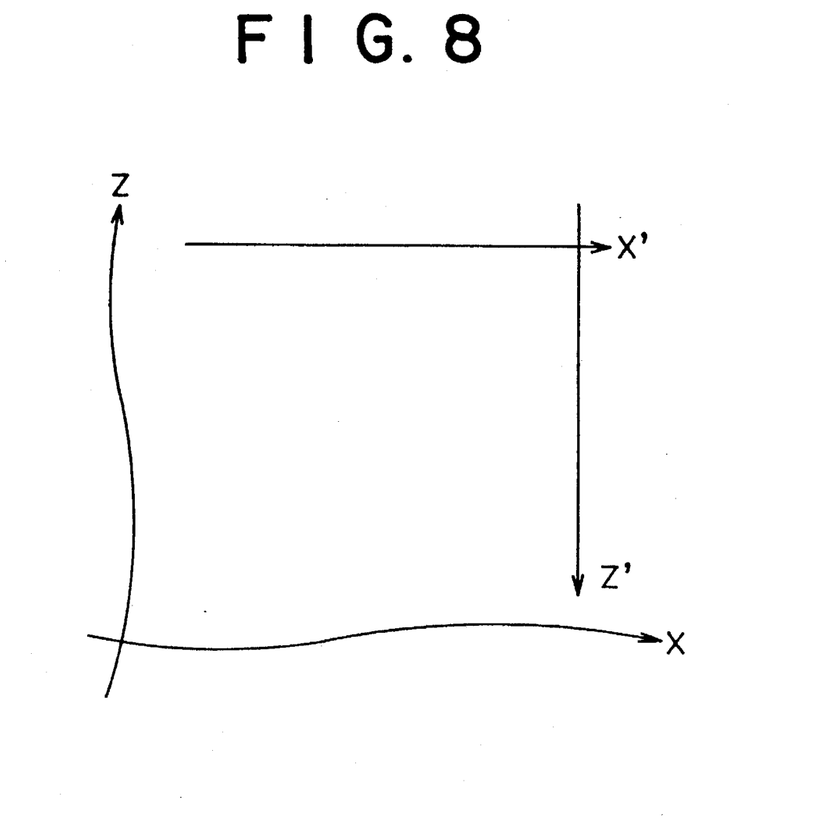
FIG. 8 is a view of originated measurement-datum within a measuring area in the first embodiment.

When measurement of the standard is finished, in ST3, rectangular spatial coordinates, as a datum of the measuring apparatus, of X' and Z' as shown in FIG. 8 is originated in the measuring area based on the relative position of the detector 21 and the standard 100 after obtaining the sample data. Furthermore, the compensation data as the difference between the rectangular spatial coordinates and the mechanical X-Z coordinates depending upon the mechanical precision of the movement system as shown in FIG. 8 is prescribed. In ST4, the compensation data is written in the memory portion 53.

Figure 9:
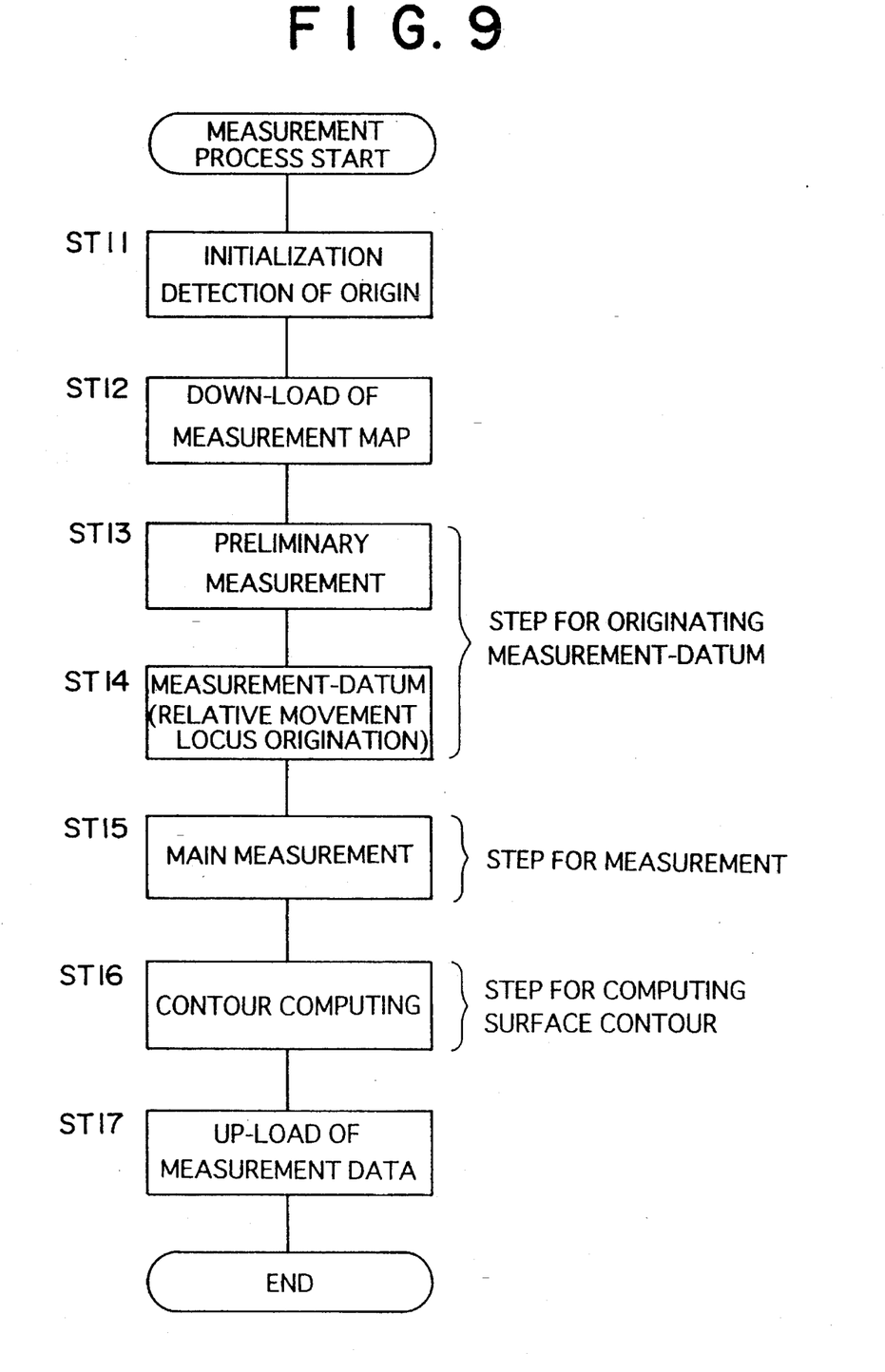
FIG. 9 is a flowchart depicting a measurement process in the first embodiment.
Figure 10:
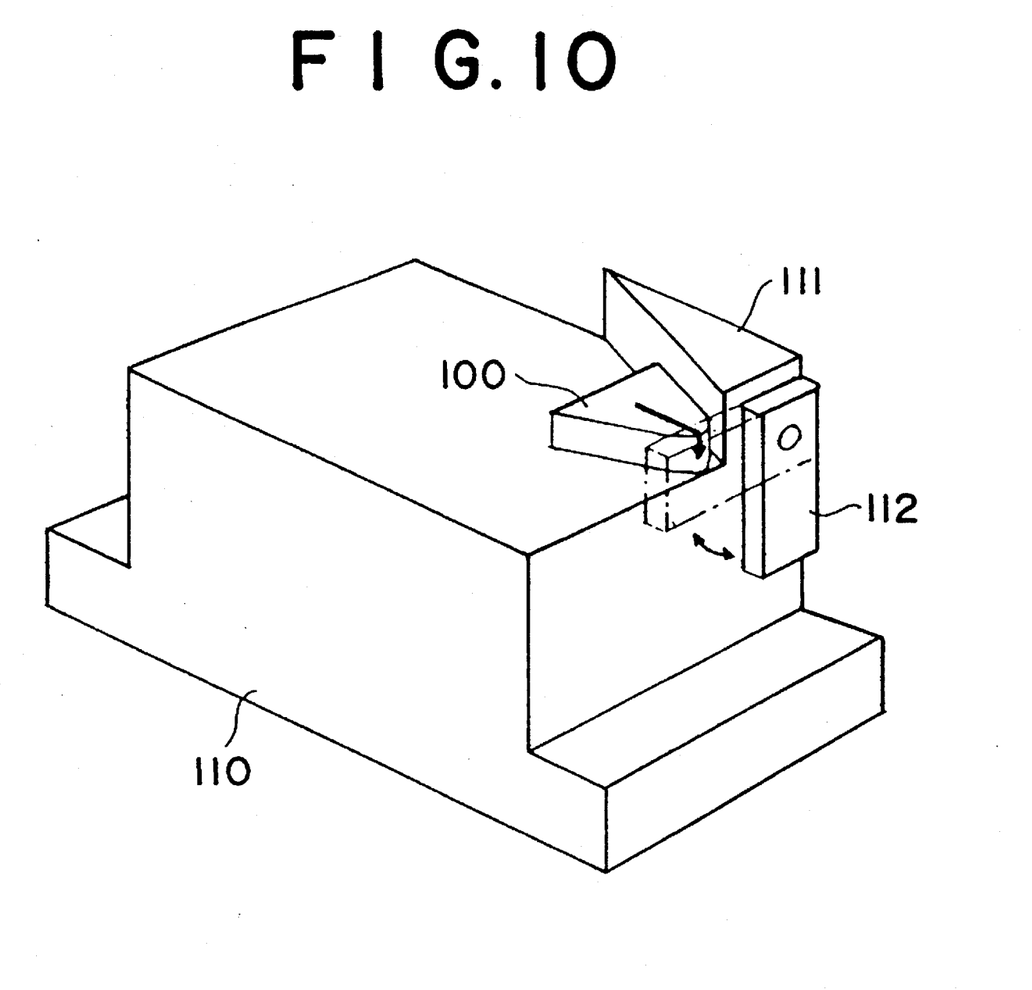
FIG. 10 is a perspective view depicting a setting jig for the measuring object in the first embodiment.
Figure 11:
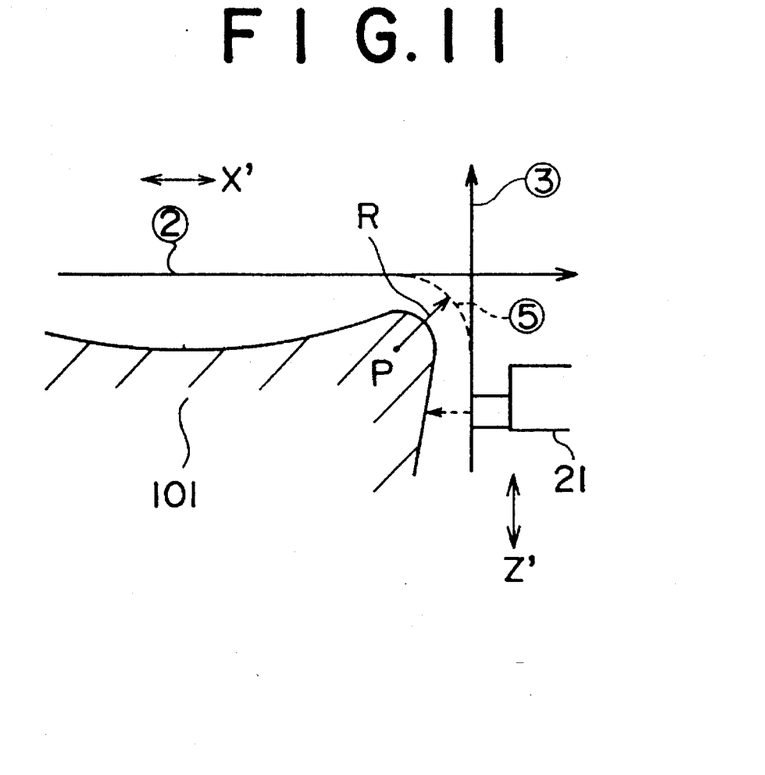
FIG. 11 is a view for explaining a movement locus of the detector in a preliminary measurement of the measuring object.

The main measurement will be conducted following a flowchart shown in FIG. 9. In ST11, the apparatus is initialized and the origin is detected. In ST12, the prepared measurement map is down-loaded from the data analysis processing unit C. If the measuring object has a right-angled portion, a measurement map for movement locus of the rectangular spatial X'-Z' coordinated (datum for the apparatus) will be down-loaded. If the right-angled portion of the measuring object 101 is that as shown in FIG. 11, the X'-axis (2) and the Z'-axis (3) are set with reference to the measuring object 101. Incidentally, the measuring object 101 is set by positioning tools 111, 112 on a fixture 110 in the measuring area, the positioning tool 112 moving in a dotted-line when setting the measuring object and locating at the solid line in measurement.

In ST13, a preliminary measurement for the measuring object 101 is conducted. In measurement, as shown in Figure 11, the non-contacting detector 21 and the measuring object 101 are relatively moved along the movement locus (2) by the measuring map. The data measured by the non-contacting detector 21 is recorded at predetermined intervals. Furthermore, the non-contacting detector 21 and the measuring object 101 are relatively moved along the movement locus (3) by the measuring map. The data measured by the non-contacting detector 21 is recorded at predetermined intervals.

Figure 12:
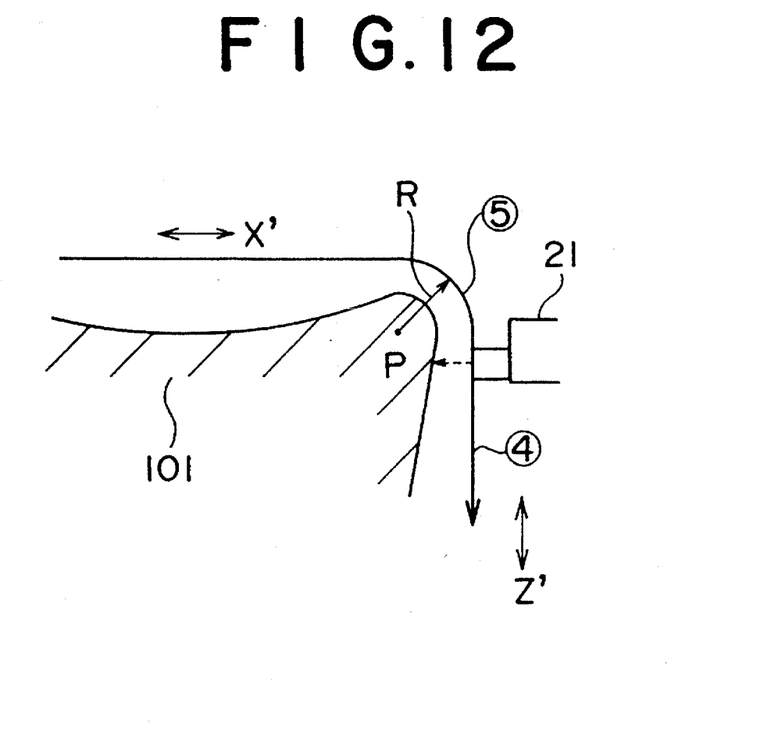
FIG. 12 is a view for explaining a movement locus of the detector in a main measurement of the measuring object.

In ST14, a measurement-datum similar to the surface contour of the measuring object is originated in the measuring area. A turning center of the detector 21 is determined based on the measured data when following the moving locus (2), (3). In other words, rotation center coordinates P for the detector 21 are decided to obtain a circular arc (5) as shown in FIGS. 11 and 12 in a state that the normal direction of the measuring object and the optical axis of the non-contacting detector 21 are coincided and that the distance between the measuring surface and the non-contacting detector 21 is within a detectable area of the detector. Accordingly, a relative moving locus (4) defined by the X'-axis, the circular arc (5) and the Z'-axis is originated as shown in FIG. 12. The data of the relative moving locus (4) is corrected by the compensation data and recorded in the memory portion 53 as the measurement-datum.

In ST15, the main measurement for the measuring object 101 is done. At the beginning of the main measurement, while the measuring object 101 is kept in the same state, the detector 21 returns to the start point for measurement automatically. The relative movement of the non-contacting detector 21 and the measuring object 101 is done along the measurement-datum of the relative moving locus (4) depicted in FIG. 12. When the relative movement of the non-contacting detector 21 and the measuring object 101 reaches to a point on the X'-axis corresponding to the point P, the non-contacting detector 21 is rotated so as to follow the circular arc (5) by means of the preferable rotation of the turn table 20. The rotation of the turn table 20 is conducted in a state that the normal direction of the measuring object 101 and the optical axis of the non-contacting detector 21 are coincided and that the distance between the measuring surface and the non-contacting detector 21 is within a detectable area of the detector. This rotation is continued until the non-contacting detector 21 follows the Z'-axis.

In these movements, the measured data by the non-contacting detector 21 is written in the memory portion 53 along with data from encoders 45, 46, 47 and 48 at predetermined intervals. In ST16, the data stored in the memory portion 53 is formulated into a surface contour data based on the measurement-datum. Lastly, in ST 17, the measured data is up-loaded to the data analysis processing unit C. By the data analysis processing unit C, the measured data is shown on a display as the surface contour data and when optionally designating a point of the surface contour, dimensions, place, angle, radius of a circular arc and the like can be obtained by the least square.

Accordingly, in this embodiment, the surface contour of the standard 100 is first measured by relatively moving the non-contacting detector 21 and the standard 100, the X'-Z' rectangular spatial coordinate is originated in the measurement are based upon the measured data of the standard 100, and the difference between the spatial coordinates and the mechanical coordinates is memorized as the compensation data. As has been explained, first of all, the measuring object 101 is set at a predetermined position in the measuring area, the measurement-datum is originated in the measuring area after compensating the profile data of the measuring object with reference to the rectangular spatial coordinates, and the surface contour of the measuring object is now obtained by a relative movement of the detector 21 and the measuring object 101 in accordance with the measurement-datum.

The measurement datum is set in the measuring area, so that the measurement-datum can be corrected easily by the compensation data made by the measurement of the standard 100. Accordingly, the apparatus according to the present invention will not require a precise assembling and adjustment. The movement system into the X- and Y-axes are only required to have a function to rotate the non-contacting detector 21 and to keep a repeatable motions precisely. Generally, such repeatable motions in the apparatus are naturally and easily kept in high level, so that a less expensive device can be produced.

As the measurement-datum according to the present invention is set in the spatial measuring area, an optional profile or a function can be used as the measurement-datum, whereby a special measuring object having a strange profile that the conventional apparatus could not measure now can be measured.

As the turn table 20 is secured to the Z-axis slider 18 to rotate about the pivot 34 along the Y-axis and has a non-contacting detector 21 thereon so as to coincide the focal point on the central axis of the pivot 34, when measuring a measuring object having a right-angled portion, the non-contacting detector 21 can measure the portion with a vertically standing state thereto by being rotated so as to oppose the center P of the circular arc. It is known that a high precision measurement requires the alignment of the optical axis of the detector 21 with the normal direction of the measuring surface of the measuring object 101 as much as possible, but the detector 21 according to the present invention always keeps a fine state for measurement. Incidentally, if the detector will be a contacting type one, a compensation process for the stylus will not be required.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The measurement-datum is not only limited to be a rectangular spatial coordinates as described in the embodiments but also to be any line, profile or a combination thereof.

As explained above, the above-explained measurement datum is established in the measuring area by compensating the relative movement locus corresponding to the measuring surface of the measuring object based on the rectangular spatial coordinates with the compensation data, but it is also available to obtain the profile data by compensating data stored in the memory portion 53 with the compensation data.

The detector used in the above-mentioned embodiments is the non-contacting detector 21 to measure the surface contour of the measuring object, however a contacting type detector which contacts with the surface of the measuring object 101 directly will be also available to use.

In the embodiments, the measuring object 101 is adapted to move in the X'- and Y'-directions, and the non-contacting detector 21 moves in the Z'-direction. It could be available that at least one of the measuring object 101 and the non-contacting detector 21 moves the X'- and Z'-axis directions.

Generally, it is enough to once measure the standard 100 before shipment, but a periodical measurement thereof is preferable in view of preventing an error which is caused throughout several years.

Incidentally, the preliminary measurement may be omitted before the main measurement, as plural same measuring object is measured after a precise positioning thereof.

Figure 13:
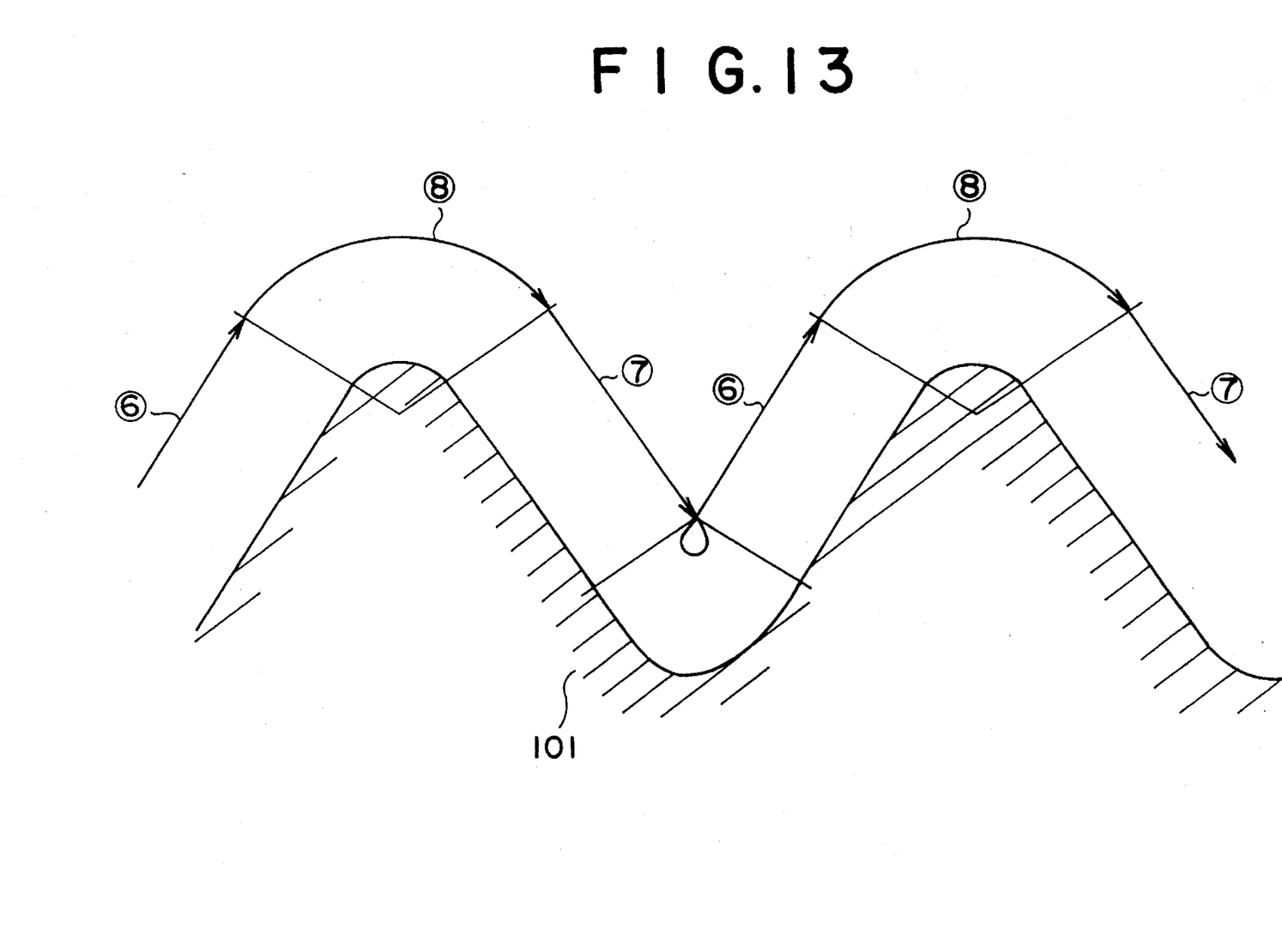
FIG. 13 is a view of originated measurement-datum when measuring another profile (sine-curve) different from the first embodiment.

An applicable profile of the measuring object is not limited to that in the above-mentioned embodiments. When the measuring object 101 has a sine-curved profile as shown in FIG. 13, a measurement-datum thereof can be organized by a combination with straight movement locus (6),(7) and a circular arc movement locus (8) to conduct the relative movement of the measuring object and the detector.

As has been mentioned above, according to the method and the apparatus for measuring surface contour according to the present invention, it will not be require a precise mechanical process and an adjustment to obtain an accurate surface contour data which could not be measured by conventional apparatus.

What is claimed is:

1. A method of measuring the surface contour of an object comprising the steps of:

taking a plurality of spaced-apart base measurements of the surface contour of the object with a detector by taking said base measurements along an elongated base datum, wherein said base measurements represent the distance between the object and said base datum;

deriving an elongated measurement datum above the surface of the object based on said base measurements, wherein said measurement datum is at least partially located between said base datum and the object, said derivation of said measurement datum including the step of storing data representative of the distance between said measurement datum and said base datum;

taking a plurality of spaced apart main measurements of the surface contour of the object with said detector, wherein said detector is moved along said measurement datum and said main measurements represent the distance between the surface of the object and the points on said measurement datum at which said main measurements were made; and generating data representative of the surface contour of the object based on said main measurements and said stored data representing said distance between said measurement datum and said base datum.

2. The method of surface contour measurement of claim 1, wherein said detector is attached to a displacement system for moving said detector relative to the object so that said detector travels along said datums, said displacement system being configured to cause the relative detector/object movement to occur along a mechanical axis, and said method further includes the steps of:

taking a plurality of measurements of a standard object with said detector along said displacement system mechanical axis;

computing compensating data representative of a difference between a spatial axis separate from said displacement system and said displacement system mechanical axis; and adjusting said measurement datum/base datum distance data with said spatial axis/displacement system mechanical axis compensating data so that said generating data representative of the object surface contour corresponds to contour measurements along said spatial axis.

3. The method of surface contour measurement of claim 2, wherein said detector takes said measurements of the object without contacting the object.

4. The method of surface contour measurement of claim 1, wherein: said measurement datum is derived so that said measurement datum has at least one section with a circular profile; and said main measurements are taken along said measurement datum circular section.

5. The method of surface contour measurement of claim 2, wherein: said measurement datum is derived so that said measurement datum has at least one section with a circular profile; and said main measurements are at taken along said measurement datum circular section.

6. The method of surface contour measurement of claim 2, wherein said displacement system moves the object relative to said detector along at least one axis to facilitate the taking of said measurements along said datums.

7. The method of surface contour measurement of claim 2, wherein said displacement system moves said detector along at a first axis to facilitate taking said measurements along said datums.

8. The method of surface contour measurement of claim 7, wherein said displacement system is further configured to move the object relative to said detector along a second axis separate from said first axis so that said datums include first sections oriented along said first and second axes.

9. The method of surface contour measurement of claim 8, wherein said displacement is configured to pivot said detector so that said main measurements are along a measurement datum having a curved profile.

10. The method of surface contour measurement of claim 4, wherein: said displacement system is configured to move the object relative to said detector along a first axis, to move said detector relative to the object along a second axis separate from said first axis and to pivot said detector; and said base measurements are taken along said first and second axes and said main measurements taken along said measurement datum circular profile section are made by pivoting said detector.

11. The method of surface contour measurement of claim 5, wherein: said displacement system is configured to move the object relative to said detector along a first axis, to move said detector relative to the object along a second axis separate from said first axis and to pivot said detector; and said base measurements are taken along said first and second axes and said main measurements taken along said measurement datum circular profile section are made by pivoting said detector.

12. The method of surface contour measurement of claim 11, wherein said detector takes said measurements of the object without contacting the object.

13. A method of determining the surface contour of an object along a spatial axis, said method comprising the steps of:

measuring a standard object with a known contour with a detector that does not contact said standard object, said detector being connected to a displacement system capable of shifting the relationship between said detector and said standard object so that said standard object measurements are taken at a number of selected points along a mechanical axis spaced from a standard object wherein said standard object measurements represent the distance between said standard object and said mechanical axis at the points on said mechanical axis at which said measurements were taken;

comparing said standard object measurements to the known contour of the standard object so as to produce compensation data representative of the difference between said mechanical axis and the spatial axis;

taking a plurality of spaced apart base measurements of the surface contour of the object to be measured with said detector wherein said initial measurements are taken along said mechanical axis;

deriving a measurement datum above the surface of the object based on said base measurements wherein said measurement datum is at least partially located between said mechanical axis datum and the object and has at least one partially curved section, said derivation of said measurement datum including the step of storing data representative of the distance between said measurement datum and said mechanical axis;

taking a plurality of spaced apart main measurements of the surface contour of the object with said detector wherein said main measurements are taken along said measurement datum including said partially curved section thereof, wherein each said main measurement represents the distance between the object and the point on said measurement datum at which the main measurement was taken; and generating data representative of the object surface contour based on said main measurement data, said data representative of said distance between said measurement datum and said mechanical axis and said compensation data so that said generated data represents the object surface contour relative to the spatial axis.

14. The method of surface contour measurement of claim 13, wherein: said displacement system is configured to move the object relative to said detector along a first axis, to move said detector relative to the object along a second axis separate from said first axis and to pivot said detector; and said base measurements are taken along said first and second axes and said main measurements taken along said measurement datum at least one circular profile section are made by pivoting said detector.

15. An apparatus for measuring the surface contour of an object, said apparatus including:

a base;

a table disposed on said base adapted for receiving the object to be measured;

a displacement mechanism attached to said base and to said table for moving said table and the object along a first axis, said displacement mechanism including a drive unit responsive to drive signals for moving said table and a table position encoder for monitoring the position of said table on said base and configured to generate table position signals representative of the position of said table;

a distance measuring detector located above said table, said distance measuring detector being configured to measure the distance between said detector and the object to produce distance measurement signals representative of the distance, said distance measuring detector being configured to perform said measurements without contacting the object;

a detector positioning system connected to said base and said detector for positioning said detector above said table, said detector for moving said detector relative to said table and the object along a second axis separate from said first axis, said detector positioning system including a displacement assembly responsive to detector positioning drive signals for selectively positioning said detector and a position encoder for monitoring the position of said detector relative to said table and configured to generate detector position signals representative of said position of said detector;

a turntable for pivotally securing said detector to said detector positioning unit, said turntable being configured to pivot said detector around a point, said turntable having a turntable drive mechanism for selectively pivoting said detector in response to application of drive signals thereto and having a position detector configured to monitor the pivotal position of said detector that generates turntable position signals representative of the angular position of said detector; and a control unit connected to said table displacement system for applying said displacement system drive signals thereto and receiving said table position signals therefrom, to said detector positioning system for applying said detector positioning drive signals thereto and receiving said detector position signals therefrom, to said turntable for applying said turntable drive signals thereto and receiving said turntable position signals therefrom and to said detector for receiving said measurement signals therefrom, said control unit being configured to:

generate said table displacement signals, said displacement mechanism drive signals and said turntable displacement signals so as to cause said detector to measure the contour of the object along a base datum, said base datum extending along said first and second axes;

receive a plurality of measurement signals from said detector representative of the distance between said detector and the object along said base datum;

generate a measurement datum based on said initial measurement signals, said measurement datum being at least partially closer to the object than said base datum and having at least one curved portion and to generate data representative of the distance between said base datum and said measurement datum;

generate said table displacement signals, said displacement mechanism drive signals and said turntable displacement signals so as to cause said detector to move along said measurement datum including said at least one curve portion thereof so that said detector makes main measurements representative of distances between said measurement datum and the object;

receive a plurality of main measurement signals from said detector representative of distance between said detector and the object along said measurement datum; and generate data representative of object surface contour based on the main measurement signals and said data representative of the distance between said base datum and said measurement datum.

16. The apparatus of claim 15, wherein said table displacement mechanism is configured to move said table along a first and third axes wherein said third axis is distinct from said first and second axes.

17. The apparatus of claim 15, wherein the table is configured to move said object along a horizontal axis and said detector positioning system is configured to move said detector along a vertical axis.

18. The apparatus of claim 15, wherein said detector is an optical measuring device.

19. The apparatus of claim 15, wherein said control unit further includes a memory for storing compensating data representative of differences in distance between spatial axes separate from said first and second axes and said base datum and said control unit generates data representative of the surface contour of the object based on said main measurements, said base measurements and said compensation data.

* * * * *